(12) United States Patent
Avrahami et al.

(10) Patent No.: US 10,810,532 B2
(45) Date of Patent: Oct. 20, 2020

(54) SYSTEMS AND METHODS FOR ACCESS CONTROL BASED ON MACHINE-LEARNING

(71) Applicant: FUJI XEROX CO., LTD., Tokyo (JP)

(72) Inventors: Daniel Avrahami, Mountain View, CA (US); Matthew Lee, Mountain View, CA (US); Jennifer Marlow, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 302 days.

(21) Appl. No.: 15/445,809

(22) Filed: Feb. 28, 2017

(65) Prior Publication Data

US 2018/0247241 A1 Aug. 30, 2018

(51) Int. Cl.
*G06Q 10/06* (2012.01)
*G06N 20/00* (2019.01)

(52) U.S. Cl.
CPC ........ *G06Q 10/0639* (2013.01); *G06N 20/00* (2019.01); *G06Q 10/06313* (2013.01); *G06Q 10/06316* (2013.01); *G06Q 10/0633* (2013.01); *G06Q 10/06315* (2013.01)

(58) Field of Classification Search
CPC .................................................. G06N 20/00
See application file for complete search history.

(56) References Cited

U.S. PATENT DOCUMENTS

| | | | |
|---|---|---|---|
| 7,221,939 B2 | 5/2007 | Ylitalo et al. | |
| 2009/0292743 A1* | 11/2009 | Bigus | .................... G06F 21/552 |
| 2009/0293121 A1* | 11/2009 | Bigus | .................... G06F 21/316 726/22 |
| 2012/0215328 A1* | 8/2012 | Schmelzer | .......... G06F 19/3481 700/91 |
| 2014/0058801 A1* | 2/2014 | Deodhar | ............ G06Q 10/0639 705/7.38 |
| 2017/0315825 A1* | 11/2017 | Gordon | .................. G06N 20/00 |
| 2018/0314327 A1* | 11/2018 | Digirolamo | ............. G06F 3/013 |

OTHER PUBLICATIONS

Garg et al., Studying daily behavior patterns using fuzzy networks, 2016 1st India International Conference on Information Processing (IICIP) (pp. 1-6) (Year: 2016).*
Anti-Social, 80 Pct Solutions, 2015, 3 pgs., [online] URL: http://antisocial.80pct.com/.
StayFocusd, Transfusion Media, 1 pg., [online] URL: https://chrome.google.com/webstore/detail/stayfocusd/laankejkbhbdhmipfmgengdelahlfoji.
Freedom, 80 Pct Solutions, 6 pgs. [online] URL: https://freedom.to/.
Dejal Time Out, Dejal Systems, LLC, 2017, 3 pgs., [online] URL: http://www.dejal.com/timeout/.
Slack, Slack Technologies, 5 pgs., [online] URL: www.slack.com.

* cited by examiner

*Primary Examiner* — Ivan R Goldberg
*Assistant Examiner* — Chesiree A Walton
(74) *Attorney, Agent, or Firm* — Procopio, Cory, Hargreaves & Savitch LLP

(57) ABSTRACT

Example implementations are directed to a method of receiving information associated with an activity, analyze the information to identify a first pattern and a second pattern, generate a customized transition model for returning to the first pattern. In response to a detected trigger indicating a transition to the first pattern, the method assesses context factors to apply the customized transition to dynamically manage access to digital resources during the transition to the first pattern. In response to a determination that a transition to the first pattern satisfies a threshold, the method restores access to the digital resources.

21 Claims, 8 Drawing Sheets

SYSTEMS AND METHODS FOR ACCESS CONTROL BASED ON MACHINE-LEARNING

BACKGROUND

Field

The present disclosure is generally directed to machine-learning, and more specifically, to systems and methods for providing access control during transitions between states based on machine-learning.

Related Art

In related art implementations, there are rules-based approaches to restricting accesses to non-work activities on digital devices during a work period. It is well known that taking breaks (both physical and mental) during work can greatly improve a person's productivity and wellbeing. A problem for workplace productivity is peoples' difficulty to quickly and successfully transition back to focused work after taking a break. Peoples can get distracted by personal business or may lack self-control to effectively manage accessing non-work related websites during work periods.

Technical approaches to restricting non-work activities on digital devices during work periods typically involve content blocking and restricting physical access to devices. However, since breaks from a work activity are known to have positive effects on peoples' wellbeing and productivity, blocking all access to non-work activities on digital devices may harm rather than benefit productivity, and thereby reduce any net productivity gained by taking a break. Accordingly, when a person transitions back to work from a break, the person may not be ready to engage in focused work activity, but may become productive in response to blocked access to non-work activities. Therefore, it may be desirable to develop systems and methods that manage access to non-work activities on digital devices to improve the person's ability to transition back to focused work activities.

SUMMARY

Example implementations described herein provide systems and methods for receiving information associated with an activity, analyzing the information to identify a first pattern and a second pattern, and generating a customized transition model for returning to the first pattern. In response to a detected trigger indicating a transition to the first pattern, the method assesses context factors to apply the customized transition to dynamically manage access to digital resources during the transition to the first pattern. In response to a determination that a level of focused engagement in activities associated with the first pattern satisfies a threshold, the method changes access to the digital resources. The information can include one or more of sensed data, pinpoint data, and environment data. For example, the information includes one or more of location data, physiological data, computer usage, phone usage, sensor data, etc. In an example, the threshold can be satisfied by an amount of interaction time with an application or group of applications, a sensor reading from a physiological sensor, a scheduled event, etc.

An example aspect of the present disclosure includes using machine-learning to generate the customized transition model based on one or more parameters, such as training data, user preferences, environmental controls, social graphs, etc. In an example implementation, the focused activities associated with the first pattern are determined through monitoring the user's behaviors through sensors, device interactions, user feedback, etc.

A non-transitory computer readable medium, comprising instructions that when executed by a processor, the instructions apply the model to dynamically manage digital resources is also provided by the example implementations.

Other features and advantages of the present inventive concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

Figure 1:
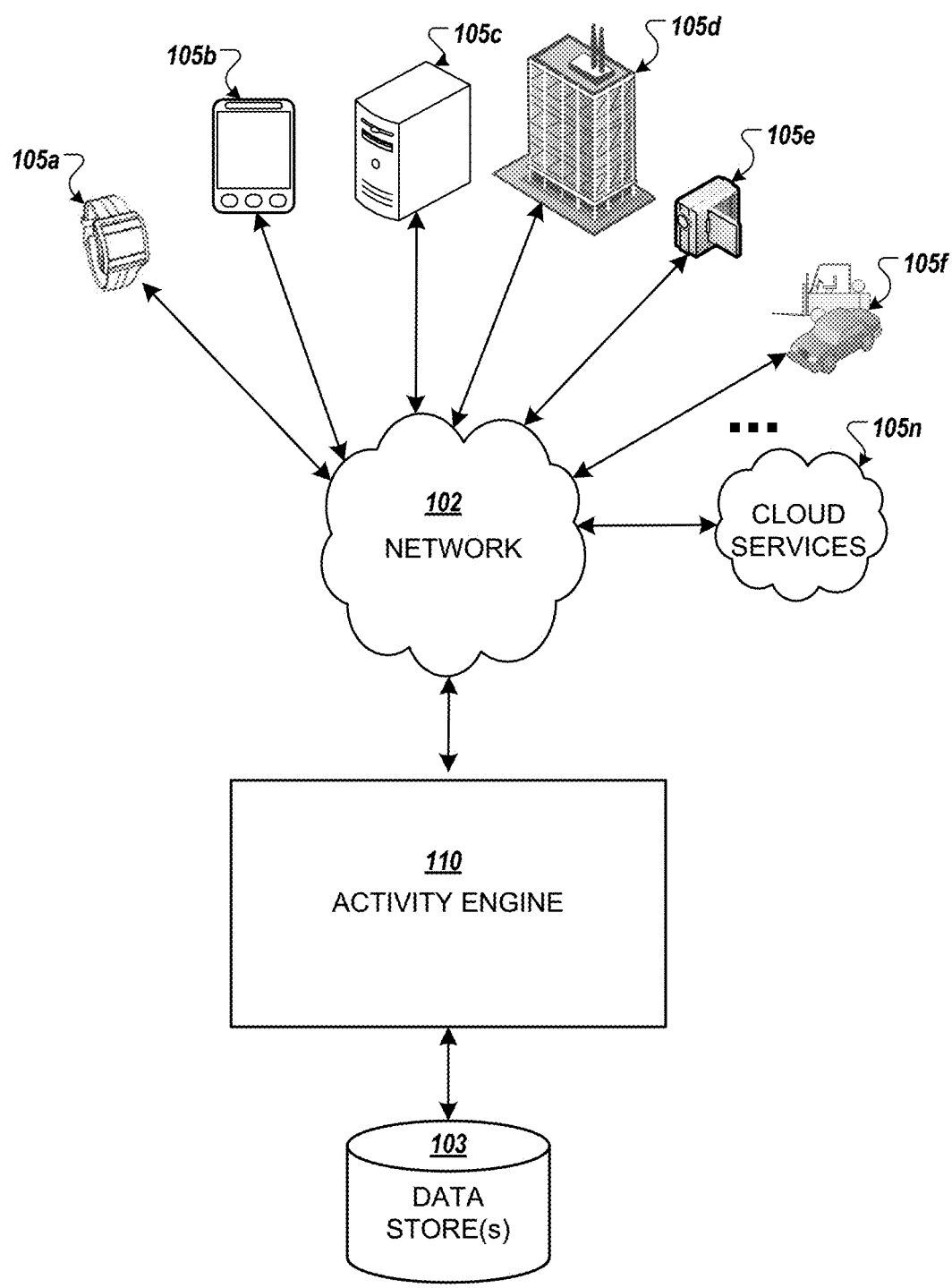
FIG. 1 illustrates an overview of a system in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

An example implementation includes generating a customized transition model for transitioning from a second pattern (e.g., a break) to a first pattern (e.g., work). As the system learns the user's patterns, the system can observe the first pattern and second pattern to discern activities that are not associated with the first pattern and determine access policies to associate with the activities (i.e., a productivity plan) that contribute to positive performances during each pattern. The customized transition model can manage the user's digital access to devices, applications, communications, content, etc. and direct the user's attention to focused engagement in productive activities during a transition to the first pattern.

An example aspect of the systems and methods described herein may improve a user's productivity after transitioning back from a break period to a state of focused work (e.g., a threshold rate of interaction with work activities). According to example implementations, the system monitors a user's activities before a break, detects a transition back to work, and directs the user to activities based on a customized machine-learning generated model. When returning from a break, the system intelligently manages access to digital activities to reduce interaction with activities that are used in 'digital breaks' that may act as unnecessary distractions from resuming focused work, such as websites, applications, personal communications, etc.

The customized machine-learning generated model is used to manage access to digital activities that are used for 'digital breaks' that may also be important for work activities. For example, social networking sites that were originally for personal communications are becoming more integral to business communications. The system manages access to digital resources that can include restricting access to improve a user's productivity during a transition period while still permitting access to those digital resources (e.g., websites, messaging tools, applications, digital content, etc.) since they may be important for work activities. The systems and methods described herein are directed to user-focused machine-learning that customizes recommendations and access control in view of the user's activities, behaviors, and preferences.

An example aspect facilitates improving a person's readiness to return to focused activities associated with the first pattern (e.g., work activities) by dynamically managing the user's access to digital resources (e.g., websites, applications, contacts, etc.). In an example implementation, a user in a workplace can be detected as ready to return to work, and in response to detecting a non-work related activity (i.e., activity associated with the second pattern), the user can receive a recommendation that directs the user to perform work-related activities (e.g., focus engagement in activities associated with the first pattern).

Accordingly, example implementations of the methods and systems associated with the present inventive concept are directed to analyzing information associated with an activity and identifying the activity as associated with the first pattern or the second pattern. For example, the first pattern can be associated with work activities of the user and the second pattern can be associated with break activities of the user.

For example, when the second pattern includes a number of non-work activities (e.g., accessing online shopping websites), the customized transition model for the first pattern can include access policies (e.g., block access to online shopping websites, alerting the user to avoid starting a personal conversation, etc.) to direct the user's attention when the user transitions from the second pattern to the first pattern (e.g., returning from a break) to work related activities (e.g., launch an application, alert the user to an approaching deadline, suggest contacting a co-worker, etc.), as described in greater detail below. For example, if the user spends a break period (i.e., second pattern) shopping for personal items, the user's continued use of the shopping website while transitioning to work (i.e., the first pattern) may prolong the break, distract the user from focused engagement in activities associated with the first pattern, and thereby harm productivity.

Further, restrictive access to digital resources is removed after the system detects a threshold level of focused engagement in activities associated with the first pattern. According to an example implementation, after the user reaches a threshold of focused engagement in activities of the first pattern, the transition to first pattern has completed and the access policy can change. For example, the user's ability to efficiently interact with a digital resources for an online purchase can improve productivity during the first pattern and/or increase the user's attention to activities of the first pattern (e.g., resolve a distraction). Accordingly, access to previously blocked digital resources can be restored to allow both work related activities on the shopping site (e.g., ordering office supplies) as well as non-work related activities (e.g., allow the user to take a brief digital break to check if an order completed successfully).

In an example implementation, a transition trigger is detected that indicates a transition from the second pattern to the first pattern. According to an example implementation, context factors are used to verify the transition to the first pattern.

In response to the user transitioning to the first pattern, the system recommends a set of activities based on machine-learned user behavior. In response to the user attempting to engage in activities associated with the second pattern (e.g., break activities) the system directs the user to perform a work activity. For example, the recommendation can provide the user with an overview of work-related applications based on the context information that can include the user's pre-break activities, scheduling information, or usage patterns.

As described in greater detail below, the customized transition model is generated using machine-learning that may apply, for example, training data, user preferences, environmental controls, clinical guidelines, safety regulations, social graphs, etc.

Aspects of the example implementation are directed to use of information that includes sensed data (e.g., from a wearable device, camera, etc.), pinpoint data (e.g., location tracking, computer usage, calendar schedule, social graphs, etc.), and environmental data (e.g., local weather, building layout, internal climate control, conference room schedules, corporate policies, etc.) The information can be used to detect patterns of a user's activity or behaviors and develop a context-sensitive transition model for a productivity plan. The model generates recommendations to perform the productivity plan after a transition to the first pattern. Further, the example implementations are directed to incorporating feedback information, productivity measurements, and sensed data, to refine the transition model.

The present disclosure includes customizing the access policies for digital resources. In an example implementation, as a user breaks from the first pattern to the second pattern and then transitions back to the first pattern, the access policies can be configured to direct the user's attention to re-engage activities of the first pattern. That is, the user is alerted to pre-break activities when transitioning back to work (e.g., the first pattern). Example implementations are directed to monitoring the user's activities, for example, based on sensed data associated with the user, and detecting a transition between the second pattern and the first pattern based on context parameters, such as pinpoint data and/or environment data. In response to determining that the user has transitioned to the first pattern, the system dynamically manages access to digital resources associated with the second pattern based on output of the transition model for the first pattern.

An aspect of the example implementation is described in reference to a workplace setting, such as an office environment, assembly line, construction site, retail stand, etc.

However, the scope of the example implementations is not limited to a specific environment, and other environments may be substituted therefor without departing from the inventive scope. For example, but not by way of limitation, other environments in which the managing of transitions between activities through access control can be conducted can include educational environments other than an office or workplace, but are not limited thereto.

FIG. 1 illustrates an overview of a system 100 in accordance with an example implementation. The system 100 includes an activity engine 110 configured to communicate with one or more client devices 105a-105n to provide a context aware productivity recommendation to a user. The activity engine 110 may be implemented in the form of software (e.g., instructions on a non-transitory computer readable medium) running on one or more processing devices, such as the one or more client devices 105a-105d, as a cloud service 105n, remotely via a network 102, or other configuration known to one of ordinary skill in the art.

The terms "computer", "computer platform", processing device, and client device are intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks.

The activity engine 110 directly or indirectly includes memory such as data store(s) 103 (e.g., RAM, ROM, and/or internal storage, magnetic, optical, solid state storage, and/or organic), any of which can be coupled on a communication mechanism (or bus) for communicating information.

In an example implementation, the activity engine 110 can be hosted by a cloud service 105n and communicatively connected via the network 102 to client devices 105a-105n in order to send and receive data. The term "communicatively connected" is intended to include any type of connection, wired or wireless, in which data may be communicated. The term "communicatively connected" is intended to include, but not limited to, a connection between devices and/or programs within a single computer or between devices and/or separate computers over the network 102. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Data associated with the user, or the environment of the user, may come from different types of client devices 105a-105n. Client devices 105a-105n can include, for example, sensor systems 105a (e.g., wearable technology including fitness trackers, physiological sensors, biometric sensors, location sensors, global positioning system (GPS) units, Bluetooth® beacons, etc.), mobile computing devices 105b (e.g., smart phones, laptops, tablets, etc.), computing devices 105c (e.g., desktops, mainframes, network equipment, etc.), location based systems 105d (e.g., control systems, building environment control devices, security systems, corporate infrastructure, etc.), camera systems 105e, connected machines 105f, as well as cloud services 105n (e.g., remotely available proprietary or public computing resources).

Client devices 105a-105n can include client services with functionality, for example, to collect and/or store sensed data, track locations, manage communications with external devices, and so forth. For example, a mobile computing device 105b can include client services to observe a user with a camera 105e, to monitor heart rate information with a wearable sensor system 105a on the user, to collect an organization structure from a corporate mainframe, etc. In example implementations, the activity engine 110 receives information from multiple client device 105a-105n.

Client devices 105a-105n may also collect information from one or more other client device 105a-105n and provide the collected information to the activity engine 110. For example, client devices 105a-105n can be communicatively connected to the other client device using WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

In an example implementation, the user may be located in an office environment that includes one or more client devices 105a-105n, and the user performs a work activity (e.g., a first pattern) and a break activity (e.g., a second pattern) that is monitored by client services. While the user is performing the work activity, such as operating a device such as computer at a desk or moving items in a warehouse, the client services gather different types of information associated with the user that are communicated to the activity engine 110. In an implementation, the client service can run on multiple devices 105a-105n associated with the user to coordinate transition control.

For example, location sensors 105a receive the user's movement in the office or warehouse, a scheduling application provides the user's meeting schedule, a wearable device obtains a user's heart rate, camera's 105e can detect gaze direction or pupil dilation, etc. and the information is sent to the activity engine 110. For computer based activities, the client service can monitor, for example, what applications are accessed by the user, input events, such as a number of keyboard strokes per minute, mouse activities, and other input.

When the user is ready to go on a break from the work activity during the first pattern, the activity engine 110 can detect a break trigger that indicates the second pattern (e.g., break activities) using the information. The activity engine 110 can detect pre-break activities of the user, detect a work trigger that indicates the user is returning to the first pattern, and generate a customized transition model based on learning the user's patterns. The customized transition model is generated using experience sampling, for example, including training data, rules, feedback, etc.

The customized transition model can output direction for the user to perform different productivity activities (e.g., a productivity plan) in response to determining that the user has transitioned to the first pattern (e.g., work activities) and dynamically manage access to activities associated with the second pattern (e.g., non-work related activities).

For example, prior to taking a break, the user may be engaged in focused work activity at their work station, leave their work station to take a break, and when they return to their workstation, a display of the workstation or the user's mobile device may present a recommendation that directs the user to re-engage in the pre-break focused work activity that aids in refocusing the user's attention to transition back to productivity. In an example implementation, the user is incentivized to perform the recommended activity through a gamification of the post break activity or reward program.

Additionally, in some examples, the user's rate of interaction is monitored during the first pattern and second pattern as feedback to the model, to improve subsequent productivity plans. For example, when the user takes a short break without interaction with the user's mobile device to check messages, the productivity plan may allow access to personal messaging applications while transitioning back to focused work to avoid a greater distraction from developing, which decreases overall productivity.

Accordingly, the user's work activities after a break are enhanced using the information collected by the client services. Through machine-learning, the activity engine 110 generates recommended productivity plans that the user can perform to direct the user to engage in focused work. The suggested productivity plan can include blocking access to a first set of digital resources, alerting the user to redirect the user from accessing a second set of digital resources, or allowing the user to access a third set of digital resources based on the transition model. As described in greater detail below, the transition model is customized through machine-learning of the user's activity or behavior patterns that indicate an increase in the user's productivity (i.e., reduced time to return to focused work activities after a break) of the first pattern.

Figure 2:
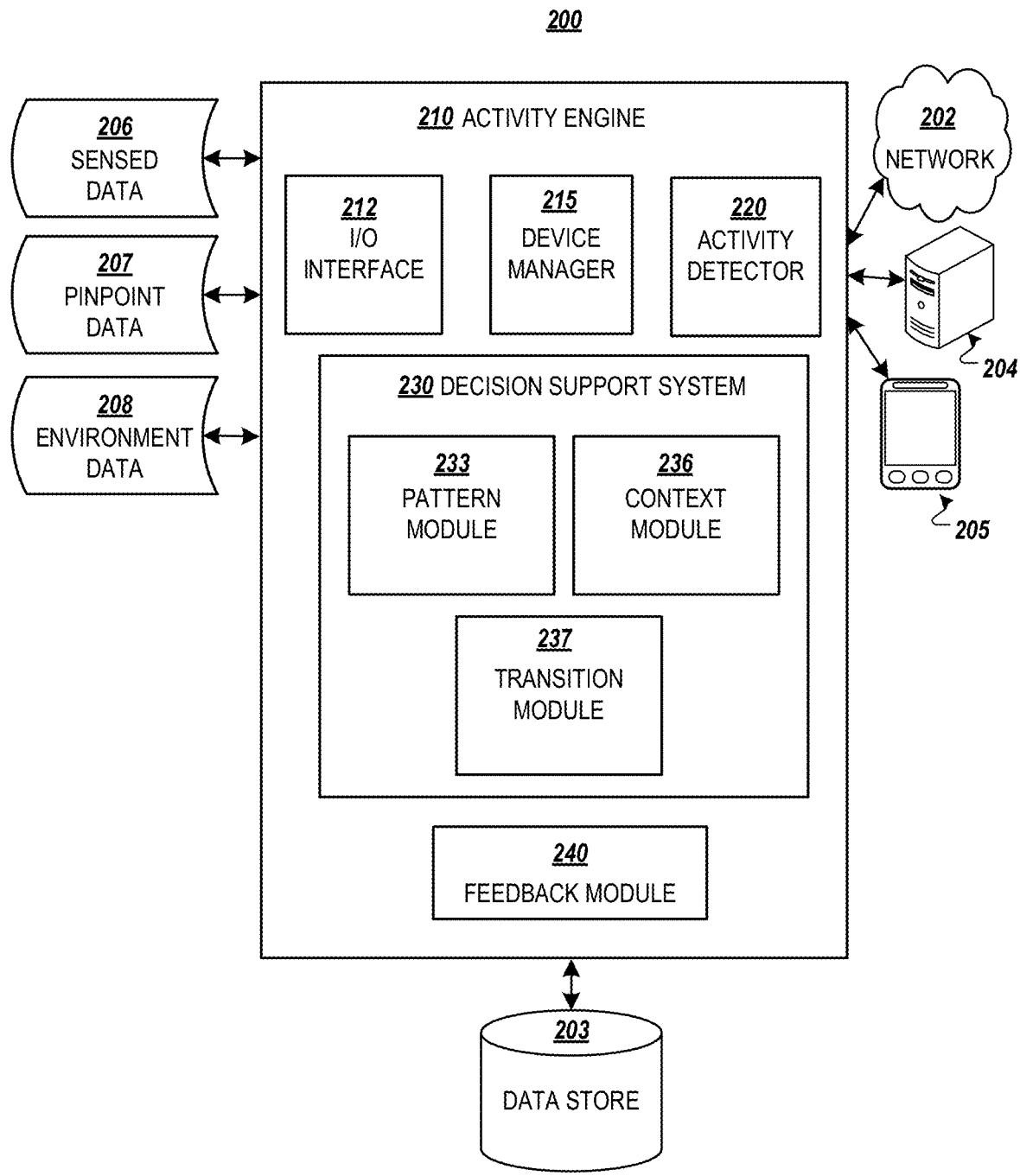
FIG. 2 illustrates an example activity engine in accordance with an example implementation.

FIG. 2 illustrates an example system 200 including an activity engine 210 in accordance with an example implementation. The activity engine 210 includes one or more I/O interfaces 212, a device manager 215, an activity detector 220, a decision support system 230, and a feedback module 240. The activity engine 210 is coupled to one or more data stores 203 for storing data (e.g., information, models, feedback, user profiles, etc.).

In an example implementation, the I/O interface 212 includes one or more communication interfaces communicatively connected with different types of client devices 205 (e.g., client devices 105a-105n of FIG. 1) directly or via a network 202 in order to receive information associated with an activity (e.g., sensed data 206, pinpoint data 207, and/or environment data 208).

The I/O interface 212 can receive data from different types of client devices 205 (e.g., client devices 105a-105n) or client services. Further, each client device 205 can provide multiple types of data, for example, sensed data 206, pinpoint data 207, and/or environment data 208. The activity engine 210 receives, via the I/O interface 212, information such as monitored data, applications data, etc., and analyzes the information, via the decision support system 230, to identify a user's patterns (e.g., a first pattern and a second pattern).

Sensed data 206 can include information about the user's physical activities. For example, a user may carry a mobile device 205 with various sensors that collect a user's movements, sleeping behaviors, eating behaviors, etc.

Pinpoint data 207 can include stored information about the user's first pattern and second pattern. In an example implementation, monitoring software can collect information about the user's digital interactions. For example, the monitoring software can receive a user's computer usage, machine interactions, communication patterns, scheduling information, etc.

Environment data 208 (e.g., ambient data) can include information about a location or organization associated with the first pattern and second pattern. In an example implementation, services can provide environment data regarding the organization information and policies, relationships between the people at the location, physical layout of the location, location based policies, etc.

The activity engine 210 can interact with one or more devices and client services to receive inputs associated with a particular user, as well as inputs that can be used for multiple users sharing a common environment. For example, client services can provide environmental data from, for example, a building sensor system that includes location information for multiple users at a location; pinpoint data from, for example, workstation computers for each user at the location; and sensed data from, for example, personalized health tracking sensors.

The activity detector 220 can monitor activity associated with the user. In some implementations, the activity detector 220 is included in the activity engine 210, may be hosted by a client device 105a-105n, and may notify the activity engine 210 of data (e.g., information) associated with the activities of the user. In an example implementation, the activity detector 220 tracks user activity to identify changes in particular levels of activity. For example, the activity detector 220 can monitor data for a user's interaction rate with digital resources on multiple digital devices, track a user's attention through eye gaze and pupil detection using cameras, track a user's heart rate data, and identify a change in the user's level of activity, based on a change in the user's heart rate that satisfies a threshold, percentage, deviation, etc.

The activity detector 220 monitoring the user's activity can be configured to detect changes associated with the user's patterns. For example, to detect that the user is transitioning between patterns, the activity detector 220 can be configured to track the user's location and signal to the activity engine 210 when the user's location changes.

According to an example implementation, to detect that the user is engaged in focused work activities of the first pattern, the activity detector 220 can be configured to track the user's interactions, area of attention, etc. For example, cameras may be used to make a determination as to the eye gaze of the user, determine head orientation, pupil dilatation, etc. Functionally, the cameras receive the activity that the user is performing and can be observed on-display, as well as looking at computer-based events. In an example, the user may be out of view of a camera (e.g., user writing on a marker board) and different types of sensors can be used to track physical activity, such as user movement by skeleton tracking.

The device manager 215 coordinates user interactions and access to digital resources across multiple devices associated with the user. For example, a user's behavior (e.g., frequency of access) associated with a digital resource can be monitored on a primary workstation computer, laptop computer, and smartphone. The device manager 215 can coordinate implementation of a productivity plan on the multiple devices of the user to aid in redirecting focus engagement in activities associated with the first pattern. For example, a productivity plan to block access to a social networking site can be implemented on a workstation computer as well as a mobile device. In another example, the productivity plan is customized is to block access to a social networking site on a user' device and allow access on a laptop computer when the machine-learning detects that access to the social networking site on the laptop is work related and/or improves productivity.

The decision support system (DSS) 230 can include a pattern module 233, a context module 236, and a transition module 237. In an example implementation, the decision support system 230 includes a training process to learn patterns of the user's activity or behaviors and generates transition models to aid the user's transition back to the first pattern (e.g., work activities). The pattern module 233 analyzes received data (e.g., sensed data, pinpoint data, environment data, etc.) associated with a particular user to identify the first pattern (e.g., work activities) and the second pattern (e.g., break activities). The context module 236 determines context factors from the data associated with the first pattern and the second pattern as input to the transition module 237. The transition module 237 generates a customized transition model for transitioning to the first pattern from the second pattern. In an example implementation, the DSS 230 can analyze data from a set of users within a common environment to develop baseline patterns and modules that are customized via input from the feedback module 240.

To identify a first pattern and a second pattern associated with the user, the pattern module 233 is configured to analyze the received data (e.g., information associated with an activity). In an example implementation, the pattern module 233 can categorize the user's activities as associated with the first pattern and second pattern. For example, the pattern module 233 labels and categorizes different events and associate actions, messages, and/or commands. In an example implementation, the DSS 230 uses machine-learning-based detection of patterns by the pattern module 233. In an example implementation, the user can mark activities, time periods, locations, etc. with labels and/or categorizes to indicate the first pattern and the second pattern. In some examples, the system 200 marks activities as associated with the first pattern and second pattern, and the user may modify or change the system's markings to provide feedback or error correct.

In an example implementation, the activities can be categorized as break vs. work, as short vs. not-short, social vs. not social, etc. If the majority of time away from the desk is spent in a meeting room, or if the time away from the desk corresponds to an event in the user's calendar, the time may be categorized as "Work" associated with the first pattern. If the time away from the desk is below a time threshold (e.g., 2 minutes) then the time away from the desk may be categorized as a 'short break'. Categorization of the information can be used to help identify the patterns, improve effectiveness of the recommendations, and enhance the type of recommendations that improve the user's transition to focused work.

For example, identifying factors indicating a short break away from a physical location may be used to allow a user to access digital resources for a digital break and prompt the user to return to work activities based on the machine-learning model. If the work time away from the desk was spent with other co-workers, the time away from the desk can be categorized as 'work' and/or 'social'. The social factor may be used to manage communication activities (e.g., email notifications, messaging applications, etc.) upon returning to the desk to transition to focused work activities, as discussed below.

In an example implementation, the user's location can be used to identify a categorization. For example, when the user leaves a primary work area (e.g., their desk) the pattern module 233 can determine the time as associated with the second pattern (e.g., a break). In other example implementations, the pattern module 233 can associate activities with the pattern based on various detected context factors.

Another example of a second pattern can be a digital break. The user may engage in activities associated with a second pattern that involves interactions with digital resources where the activities are not related to the first pattern. For example, the user's interaction with a digital activity may be detected as activities associated with a second pattern based on details of the activity, such as a message recipient, an account profile, a shipping destination, etc.

A digital resource can be associated with a first pattern and a second pattern based on context factors. For example, the user interaction with a messaging service via a handheld device may be associated with a second pattern and the user interaction with the messaging service via a workstation device may be associated with a first pattern. The processing device can determine whether the user's interaction with the digital resource is associated with either the first pattern or second pattern.

In an example implementation, the pattern module 233 uses a set of training data to associate received data with the first pattern and second pattern. The set of training data can include a collection of positive examples and negative examples of the first pattern, as well as positive examples and negative examples of the second pattern. A positive example can be categorized as consistent with the pattern and a negative example can be categorized as inconsistent with the pattern. Sets of training data can be developed based on the environment of the user. For example, a set of training data for an office environment may include positive examples of sensed data for the first pattern such as sitting at a desk, talking to a business contact, user interaction rate with work related applications, etc.

Since an application may be used for both work related activities and non-work related activities, the training data can be developed through experience sampling to aid in identifying usage of applications as work related verses non-work related activities. Negative examples of the first pattern can include leaving a cubicle, picking up a personal item, activating a personal account on a social media website, etc.

According to an example implementation, the pattern module 233 can employ a training phase to prompt the user to categorize digital resources (e.g., web sites, applications, etc.) when as activity associated with the first pattern (e.g., work-related) or activity associated with the second pattern (e.g., non-work-related). For example, when a messaging application is launched, the user can be prompted to mark the messaging application as non-work related usage. Further, if during a subsequent usage of the messaging application, the user responds to training prompts that usage is work related, the pattern module 233 can observe corresponding behaviors associated with the category of usage. Activity associated with the first pattern and second pattern include a digital resource identifier as well as various context factors as discussed in further detail below. For example, accessing a website on a handheld mobile device in a location and accessing the website on a desktop device in the same or different location are recognizable as distinct or related activities based on the machine-learning of the user's behaviors.

Additionally, the set of training data for the office environment includes positive examples of the second pattern, such as being located in a break area, talking to a personal contact, etc. Negative examples of the second patterns may include entering a conference room, talking to a business contact, carrying a notepad, activating a work related mobile application, etc.

The pattern module 233 analyzes the information to identify triggers that indicate a transition from the second pattern to the first pattern indicative of a transition to return to work. For example, the pattern module 233 can analyze the received data to identify triggers that indicate a transition by comparing detected levels of activity that indicate a change between the patterns. In an example, a user detected as returning to their desk may be categorized a trigger indicating the user is transition to return to work (e.g., first pattern activities). The pattern module 233 can generate instructions for the activity detector 220 to detect triggers.

The activity detector 220 is configured to detect activities, such as a change in sensed data 206 or rate of interaction through pinpoint data 207. Based on a pattern identified by the pattern module 233, the activity detector 220 monitors for activities associated with the first pattern to detect pre-break activities that may be productive to resume post-break. During the second pattern (e.g., a break) the activity detector 220 can track the user's activity to verify if a transition to break occurred. Detected triggering data indicating a break has started may include, for example, a time of day, leaving a desk, closing a particular work related application, using an application associated with personal use away from the desk, such as a mobile phone, interaction with a social contact, etc. Some negative examples of the first pattern may or may not align with positive examples of the second pattern and vice versa.

Thus, the context module 236 of DSS 230 develops rules that can include assigning a weighting factor to an activity based on additional parameters through the machine-learning process.

According to an example implementation, the context module 236 can use the data (and feedback from the feedback module 240) to recognize context factors that the DSS 230 to verify that a transition to the first pattern or the second pattern. For example, the context module 236 can recognize pinpoint information that may indicate a scheduled activity associated with the first pattern to override an indication that falsely identifies a transition to the second pattern.

In an example, the user may be detected as returning to their desk (e.g., transitioning to the first pattern), but their mobile device (e.g., pinpoint information) may indicate they are still engaged with personal social interaction (e.g., the second pattern), and therefore have not returned to work related activities after a break (e.g., low productivity). In this situation, the context module 236 recognizes data associated with the second pattern that is inconsistent with the first pattern, and based on the transition module 237, block, alert, or allow access to the non-work related activities.

In an example implementation, the context module 236 can include a set of policies to determine whether the information is useful as criteria for managing access to digital resources via the machine-learning. The context module 236 can assign a weight to the information based on statistical analysis. For example, the context module 236 may weight a set of factors based on statistically analyzing the users past behavior patterns. In an example, a user is returning to their office space after eating lunch and the calendaring system indicates that meetings are scheduled. In this example, if the past behavior of the user transitioning back to work indicate low productivity (e.g., late to join the scheduled meeting) when the factors are present in combination, then the context module 236 weights the factors as corresponding to a transition period that requires a high level of transition control. The context module 236 can pass the weighted combination to the transition module 237 for developing a customized productivity plan for the user when the combination of factors is detected.

The transition module 237 generates a customized transition model for the user that manages access to digital resources (e.g., the productivity plan) to augment the transition to the first pattern (e.g., a return to work) as described in greater detail below in reference to FIG. 3-4. In some example implementations, the transition module 237 adapts the transition model for the transition to the first pattern (e.g., return to work) based on the second pattern (e.g., break activities). In an example implementation, the transition module 237 can generate the customized transition model employing the context module 236.

For example, the context module 236 can provide factors for the transition module 237 to set access control to non-work related activities based on the second pattern (e.g., a duration of the break, type of break activities, number of scheduled work related events in an approaching time period, etc.). Additionally, context module 236 may cause the transition module 237 to enable or disable types of access policies.

For example, the context module 236 can enable the transition module 237 to include access policies in the productivity plan (e.g., allow access to weather websites) based on environment data 208 (e.g., poor weather, increased traffic, etc.) that past behavior indicates improves the user's transition to focused work (e.g., motivations to complete work).

In another example, the context module 236 can enable the transition module 237 to include access policies in the productivity plan (e.g., block access to social network sites) based on pinpoint data 207 (e.g., upcoming meeting schedule) and/or sensed data 206 (e.g., break activities including social interaction, etc.).

The transition module 237 uses the pre-break activities (e.g., sensed data 206, pinpoint data 207, and environment data 208) to generate the customized transition model. For example, the activity detector 220 can monitor active interaction with synchronous and semi-synchronous interpersonal communication tools such as a chat application prior to a break. The pattern module 233 can monitor user behaviors associated with the interpersonal communication tools to determine if the user reengages the interpersonal communication tools after the break. When the pattern module 233 recognizes user behaviors of reengaging with pre-break activities upon returning from break, the transition module 237 include instructions to temporarily save pre-break activities and recommend the pre-break activities to the user post-break. The user behaviors of reengaging with a pre-break activity can be on an application to application basis. That is, the transition module 237 can generate the customized transition model based on user behaviors according to each digital resource associated with one or more digital devices of the user.

The transition module 237, based on input from the activity detector 220 and pattern module 233, uses indicators of focused activity to generate the customized transition model. Indicators of focused activity can include rates of user input (e.g., keyboard and mouse interaction), attention detection (e.g., analysis of mental load from camera captured pupil dilation, eye gaze, etc.). For example, during usage of a digital resource (e.g., website, application, etc.) that is categorized as work-related, the activity detector 220 can gather information and the pattern module 233 can analyze the information to determine indicators of focused activity.

Based on user behavior of post-break activities, the customized transition model can block, alert, grant access to the pre-break activities, as well as recommend to re-engaging the pre-break activities. When the activity detector 220 detects that the first pattern (e.g., work activities) includes non-work related activities prior to a break, the customized transition model can also grant access to the non-work related activities when the user returns to their desk from a break based on user behaviors of reengaging with pre-break activities. For example, the customized transition model can grant access to specific pre-break websites to allow the user to complete a conversation and avoid the social cost of preventing communication from continuing after the break. The customized transition model can include access policies to grant access to non-work related activities when, based on the pattern module 233, user behaviors indicate the value of allowing access may be higher than the benefits of improving transition to work. For example, the user communicating with a spouse via a messaging service may be detected by the activity detector 220, the pattern module 233 may observe that user responds to blocked access to the messaging service by telephoning the spouse, and compare the time until it takes the user to return to focused work after the telephone call verses the messaging service.

The transition module 237 adapts recommendation to direct the user during the transition to the first pattern (e.g., work activities) to perform the productivity plan, for example, suggesting activities that either directly or indirectly results in increased focused engagement in activities associated with the first pattern.

The transition module 237 learns between cycles of the first pattern (e.g., work activities) and the second pattern (e.g., break activities) including first patterns where the user rejects or does not complete the recommendation. For example, when the user access a non-work related activity during a transition phase, the DSS 230 can output an alert to the user to avoid the digital resource associated with the non-work related activity, and the device manager 215 can detect if the user engages the digital resource on one or more of the devices 204, 205 associated with the user. Based on the user overriding the alert, the transition module 237 can update the customized transition model suppress the alert or further limit access to the digital resource based on the user's rate of interaction with focused work activities in subsequent cycles that present a common sequence of behaviors.

The transition module 237 generates the model out of the observed correlations that contribute positively for the particular user to iteratively improve the model, and thus improve the recommendations thereby increasing the user's productivity during transitions to the first pattern.

The feedback module 240 is configured to provide evaluation information back to the DSS 230 for refining and improving the DSS 230 functionality. For example, the feedback module 240 can gather user input to identify a set of digital resources that are work-related vs. non-work-related. From the set of non-work related digital resources, the transition module 237 can assign subsets of the non-work-related digital resources (e.g., websites and applications) to a blocking access policy, restrictive access policy, alerting access policy, and/or a permissive access policy. The feedback module 240 can collect information from the user to adapt the assigned access policy for a digital resource.

For example, the activity of a user rejecting an alert to avoid the digital resource and then using the digital resource for non-work activities can be identified by the feedback module 240 and the transition module 237 refines the productivity plan in a manner that reduces the likelihood of the user rejecting the recommendation (e.g., assigning a different access policy to the digital resource). The DSS 230 determines the recommendation for the productivity plan in view of the context factor during a transition to the first pattern. The feedback module 240 can also gather feedback information that indicates the effectiveness of the productivity plan compared to collected data when the recommendation is not accepted during the first pattern.

For example, the DSS 230 can intermittently (e.g., once every hour) prompt the user to rate their level of work focus (e.g., on a point scale). The transition module 237 use the user rating of work focus level to build a machine-learning transitional model that predicts the work-focus ratings. The transition module 237 further adapts the transition model based on feedback from the feedback module 240. For example, during execution of the transition model, the feedback module 240 can prompt the user for ratings of work focus to compare the rating to the focused work as indicators to iteratively refine the transition model.

The transition module 237 can further customize the transition model by observing correlations in data gathered by the feedback module 240. In an example implementation, the transition module 237 uses monitored data during the second pattern (e.g., a break) that correlates positively with an access policy during the transition back the first pattern based on focused work performance measurements. That is, transition module 237 promotes work-related activities based on monitored data from previous cycles of the first pattern as well as break activities during the second pattern. In some cases, when the access policy is not accepted (e.g., the user overrides a block to the digital recourse), positive performance measured after transitioning to first pattern can be used to improve the next recommendation by updating the model to include new access polices (e.g., alert the user, prompt the user to categorize the usage, etc.) related to the digital resource.

In an example implementation, when the user's focus level changes from the first pattern to the second pattern and then returns back to the first pattern (e.g., work, break, work), the productivity measurement of the cycle can be compared to a previous cycle (e.g., the first pattern and the return to the first pattern), and then the feedback module 240 can evaluate the factors applied in each cycle's recommendation output. For example, the feedback module 240 can evaluate the effectiveness of the recommendation (e.g., the productivity plan) by comparing data (e.g., time to return to focused work) between subsequent cycles (e.g., a transition performed by the user who rejects the access policy and a subsequent transition performed by the user who accepts the access policy).

In an example implementation, the feedback module 240 compares levels of performance between the first pattern and the second pattern. In an example implementation, the feedback module 240 observes levels of focused work (e.g., rate of interaction) after a transition to the first pattern. This feedback can be used by the DSS 230 to adapt the recommended productivity plan. For example, based on feedback from feedback module 240, the activity engine 210 can determine that a desired increase in rate of interaction was not reached, and the system may adapt the productivity plan to block additional digital resources, recommend work related activities, etc.

A transition control application (e.g., a client service), such as a mobile application running on a smartphone 205, can be used to interact with the activity engine 210 to provide an input and receive the output from the activity engine 210. The transition control application can interact with the activity engine 210 directly or indirectly, such as via a network. In an example implementation, the transition control application receives instructions to direct the user activities based on the recommendation associated with the transition model. For example, the transition control application can execute the output of the activity engine 210 that directs the user to perform a productivity plan as described in greater detail below in reference herein.

Figure 3:
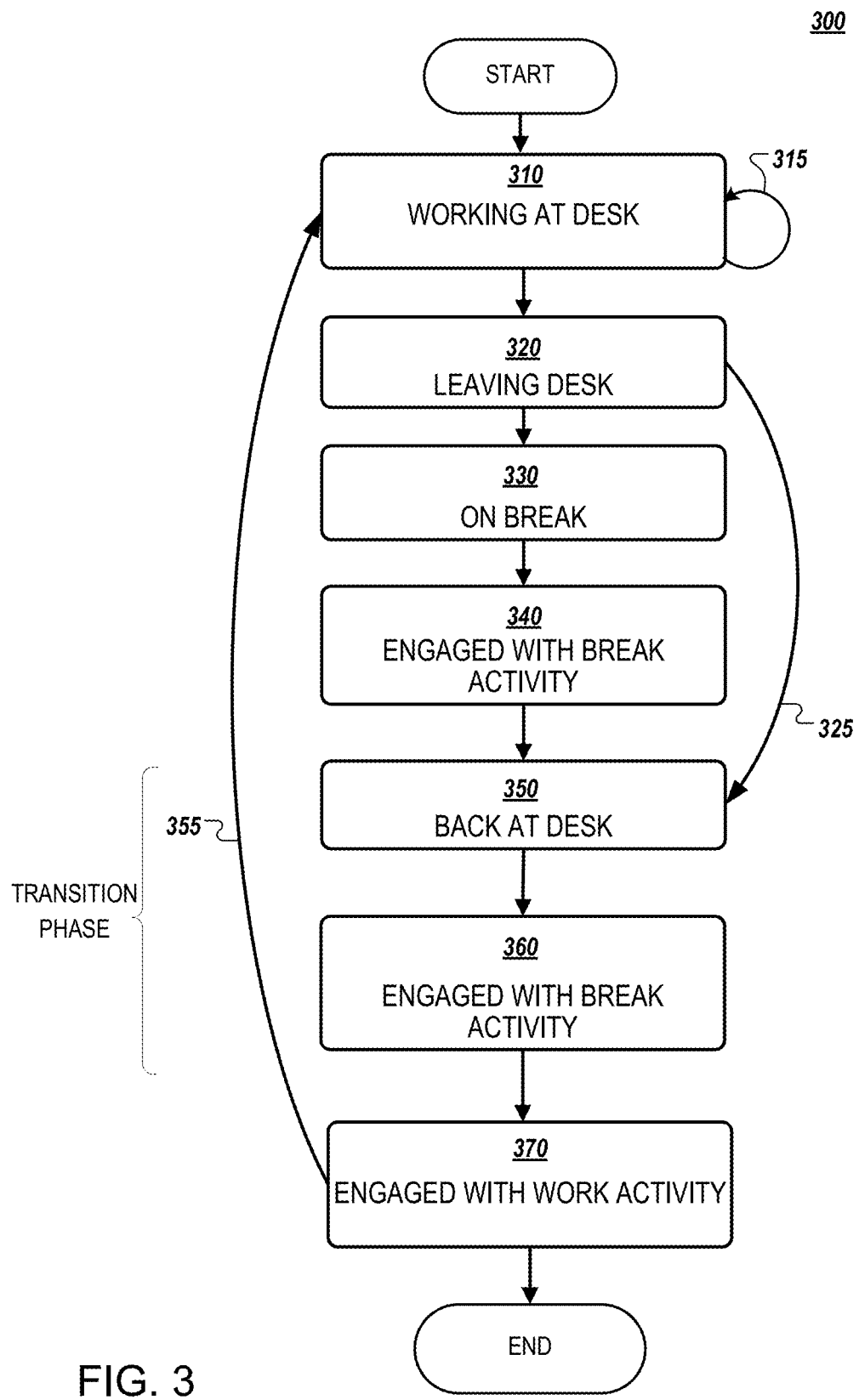
FIG. 3 illustrates an example user sequence in accordance with an example implementation.

FIG. 3 illustrates an example user sequence 300 in accordance with an example implementation. In an example cycle, a user may be working at their desk 310 performing work activities 315 and leave their desk 320 to go on break 330, engage with break activity 340, then return back to the desk 350. During a transition phase (e.g., 350 and 360) to focused work, the user may continue to engage in break activity 360 after returning back at the desk. Eventually, the user engages with work activity 370 and returns to working at the desk 355.

In an example implementation, information associated with a user's activities are gathered and analyzed to identify a first pattern (e.g., work activities) and a second pattern (e.g., break activities).

The user sequence 300 illustrates an example implementation that detects the user changing from a location (e.g., working at desk) as part of the first pattern and second pattern. According to the example user sequence 300, the user's change in location is a factor in detecting transitions between the second pattern and the first pattern.

According to other example user sequences, the user can transition to the second pattern without changing locations. For example, the user may engage in activities associated with a second pattern that involves interactions with a digital activity or digital resource. For example, the user can engage a messaging service via a handheld device as an activity associated with a second pattern and via a workstation device as an activity associated with a first pattern.

According to another example, the user can engage in multiple activities via a digital resource and details of each activity (e.g., message recipient, an account profile, a shipping destination, etc.) are analyzed to identify the first pattern (e.g., sales activities) and the second pattern (e.g., management activities).

Further, the example implementation detects a trigger indicating a potential transition to the first pattern, such as in user sequence 300, the user returning to the location (e.g., back their desk 350). The activity engine can determine the monitored behavior indicates that the user is returning to work. However, the trigger indicates that the potential transition to first pattern and may not be sufficient to verify the transition has occurred. The detected trigger causes the activity engine 210 to further determine the user's state (e.g., the first pattern or the second pattern) based on additional information, such as other sensed data 206, pinpoint data 207, environment data 208, etc. For example, the trigger may indicate detected user activity is associated with the second pattern and the user is still engaged with break activity 360.

For example, if the user returns to their desk 350 after a break 330 (e.g., a trigger indicating the first pattern) to go to a meeting or perform work activities at another location 325 (e.g., the first pattern), additional parameters associated with the first pattern and the second pattern can provide context to the user's state. Accordingly, context factors are combined to assess whether the user is transitioned back to work or has returned to the workspace but is not ready to return to work activities. In the example user sequence 300, detecting a user returning to their desk 320 may be associated with both the first pattern (e.g., work activities) while usage of digital resources is associated with the second pattern (e.g., engaged with break activities 260).

In an example implementation, the triggers and context factors are be assigned weights based on the analysis of the information to identify the first pattern and second pattern. The activity detector 220 can detect a trigger and inform the DSS 230 of a potential transition to the first pattern that is verified based on the weighted factors via the context module 236.

Through repetitive machine-learning, the activity engine 210 is able to iteratively improve identifying activities related to usage of digital resources associated with the first pattern verses the second pattern that indicate a potential transition from the second pattern to the first pattern. The activity engine 210 is able to recognize context factors associated with the second pattern that are inconsistent with the first pattern. Accordingly, if the user switches (e.g., returns to desk 350) from being on break 330 and engages in break activity 260 before being engaged with work activities 370, the activity engine 210 may learn context factors (e.g., time of day, a meeting schedule, conference room location, presence of a supervisor, history of working in certain locations, etc.) that for customizing a productivity plan to shorten or eliminate the time spent on the second pattern (e.g., engaged with break activity 360) while transitioning back to work activities 370. Through repetitive user interaction and feedback, the DSS 230 can compare factors to identify correlations between the context and level of user engagement. According to an example implementation, a user interface allows the user to associate and disassociate learned context factors to further customize the productivity plan.

To verify whether the user has transitioned to the first pattern (e.g., engaged with work activities 370), the activity engine 210 can calculate a threshold transition confidence factor using the machine-learning. In an example implementation, the activity engine 210 weights the user's rate of interaction and engagement with digital resources for work activities as factors to determine access policies to implement to restrict access to digital resources used for non-work related activities (e.g., activities associated with the second pattern) while transitioning back to work (e.g., the first pattern). Accordingly, the transition back to work 310 can be determined in view of rate of user interaction with work activity 370 satisfying the threshold transition confidence factor. In response to verifying the detected user activity in view of the context factors indicate a transition to the first pattern and user activity of the second activity 360, the activity engine can present a productivity plan (e.g., an access policy for digital resources) to direct the user to engage in work related activities (e.g., activities associated with the first pattern).

The DSS 230 can detect the user is transitioning to the first pattern based on a trigger that is verified in view of the weighted factors via the context module 236. After the DSS 230 determines the transition to the first pattern has been triggered, the activity detector 220 can detect activities associated with the second pattern, and in response to detecting the activities associated with the second pattern during the transition, the DSS 230 can apply the access policy to one or more digital resources being used with the activities associated with the second pattern.

According to an example implementation, the productivity plan can include proactive directions for the user during the transition period by directing the user to specific work-related applications, sites, and tools (e.g., work related websites, work emails, business applications, etc.) to focus the user on resuming work immediately after a break. For example, when the user returns to their desk 350 and unlocks the computer, the computer can display an overview of all applications open on the computer, highlight work-related applications with shortcuts to direct the user to commonly accessed work related digital resources. Additionally, running digital resources that are associated with a block policy or an alert policy can be visually deemphasized or hidden on the overlay. The activity engine 210 provides recommendations to direct the user to perform the productivity plan.

For example, in response to the activity detector 220 detecting that the user's level of interaction with activities associated with the second pattern reach a threshold, the DSS 230 may determine the user is transitioning to a digital break (e.g., the second pattern). In an example user sequence (not shown), the user may return to their desk, begins to engage in work activities, and then engages in a messaging application on their mobile device with a personal contact for a period of time (e.g., ten minutes). In this example user sequence, the DSS 230 determines that the user was transitioning back to a first pattern (e.g., returning to work after a physical break) and then the user transitioned to a digital break (e.g., a prolonged personal conversation). During the next transitions from the second pattern (e.g., the digital break) to the first pattern (e.g., engaging the work activity), the transition module 237 can apply a productivity plan to redirect the user's attention to focused activities associated with the first pattern. The transition module 237 can apply access policies and determine redirection suggestions in view of the feedback module 240. The activity engine 210, via the I/O interface 212, can provide recommendations to direct the user to perform the productivity plan executed by digital resources 202, 204, 205 and direct the user's attention to focused activities. For example, the digital resources 202, 204, 205 can suppress notifications, display statistical information to the user (e.g., time per pattern, time per activity, rate of interaction per activity, etc.), alert the user to a recent first pattern activity, etc.

Figure 4:
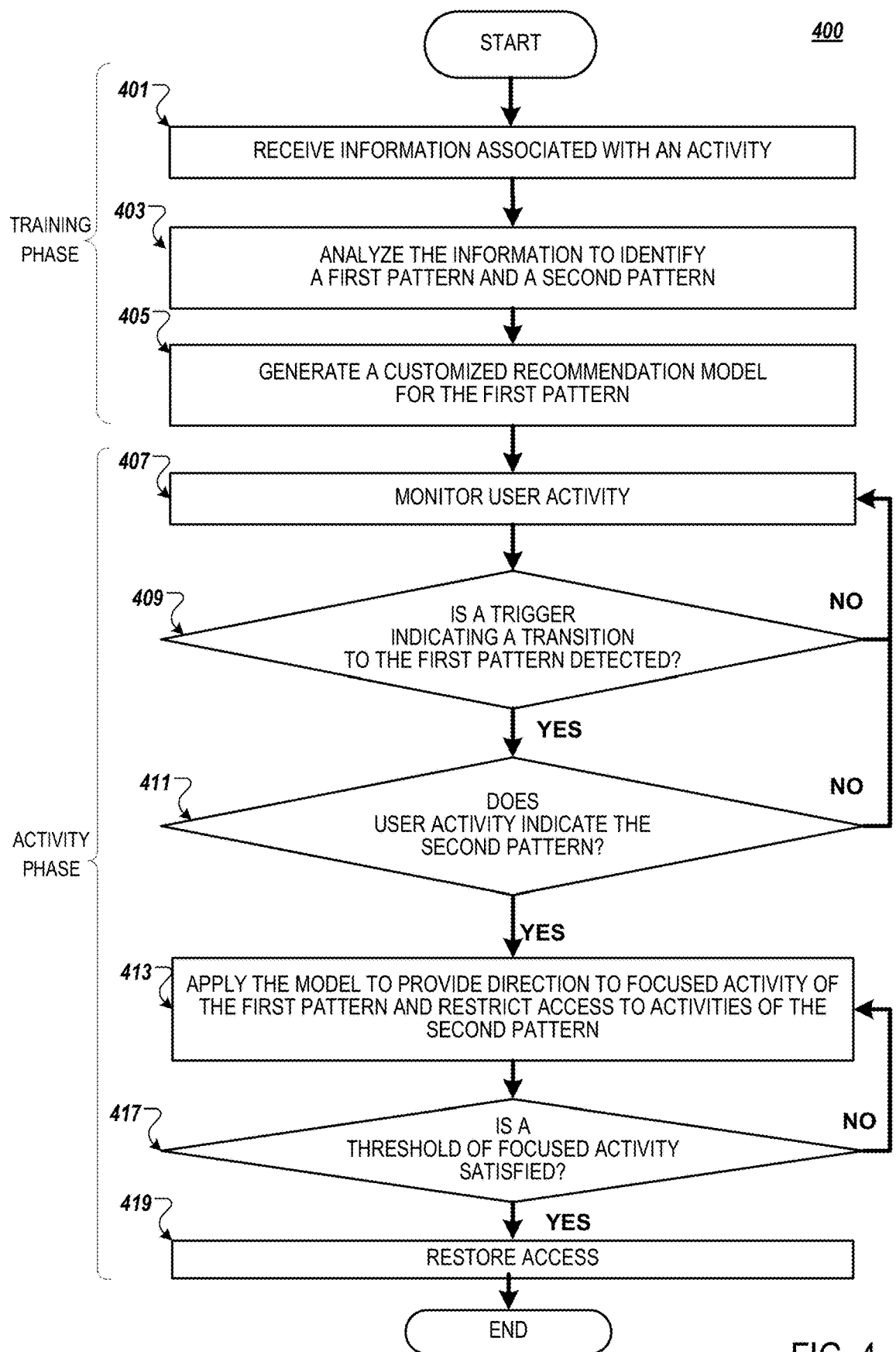
FIG. 4 illustrates a server flow diagram for a customized model in accordance with an example implementation.

FIG. 4 illustrates a server flow diagram of method 400 for a customized model in accordance with an example implementation. The method 400 is performed by processing logic that may comprise hardware (circuitry, dedicated logic, etc.), software (such as operates on a general purpose computer system or a dedicated machine), or a combination of both. Method 400 may be performed by the activity engine 110 of FIG. 1. Though method 400 is described below as being performed by an activity engine, method 400 may also be performed by other processing logic.

At 401, the processing device receives information associated with an activity. In an example implementation, the information can be gathered by client services that include sensed data 206, pinpoint data 207, environment data 208. Information associated with the user can be provided from multiple client services in parallel. Client services can include any number of resources for collecting data, such as, cloud services, data repositories, scheduling applications, building control systems, mobile devices, smartphones, health tracking sensors, cameras, etc.

At 403, the processing device analyzes the information to identify a first pattern and a second pattern. In an example implementation, the first pattern and second pattern may be indicated by sensing changes in the user's physiological data, such as, body position, location, heart rate, sugar levels, blood pressure, eye gaze, vocal activity, body temperature, etc. For example, a camera may monitor when a user changes positions or leaves a workstation, or whether there are any visitors at the workstation. The user's patterns may also be indicated by interpreting pinpoint data that indicates changes in activity. For example, the user's patterns may be indicated by computer activity, noise levels, social interactions, scheduled activities, peripheral device usage, etc.

The user's patterns may further be indicated via environment data such as lighting system activity or internal or external building temperatures. For instance, the processing device can analyze location data to determine that the user has moved away from a designated workstation based on the sensed data associated the user. In another example, the processing device may correlate a user's first pattern (e.g., work activities) with activation of a digital resource (e.g., spreadsheet application). The processing device can identify a trigger (or series of triggers) that indicates the user is transitioning to the first pattern. In example implementations, the processing device uses training data to correlate received information with the first pattern and the second pattern. In an example training data set, the user may be prompted to label time periods to categorize information (e.g., digital resource usage) with the first pattern and/or the second pattern.

In an example implementation, the processing device analyzes the information to identify triggers that differentiate the user's activity during the first pattern and the second pattern. For example, sensed behavior, such as changes in the user's body position, location, heart rate, sugar levels, adrenaline, blood pressure, eye gaze, etc., can be analyzed to determine if the trigger correlates exclusively with one of the first pattern or second pattern.

At 405, the processing device generates a customized transition model for the first pattern based on machine-learning. The customized transition model can include instructions to implement an access policy based on the information and the first pattern. The customized model is generated using one or more of machine-learning techniques associated with a set of training data, user preferences, environmental controls, clinical guidelines, safety regulations, and social graphs.

In an example implementation, the processing device can generate the customized transition model based on a hierarchical library of models. The processing device can select from the hierarchical library of models based on different data (e.g., sensor data, pinpoint, etc.). For example, the customized transition model can include different models for different times of day (e.g., a different model for the morning and the afternoon). Each model in the hierarchical library of models can include different proactive directives to work related activities and access policies for non-work related activities (e.g., a productivity plan) and be designed based on a first pattern or data. For example, the hierarchical library of models can include a variety of models for different devices accessible by the user within a space (e.g., allowing access to digital resources on a mobile device while restricting access via a desktop device). The processing device can generate the customized transition model by incorporating models from the hierarchical library of models based on the user's patterns.

The customized transition model can include different model for different work types. For example, the customized transition model for a user with a first pattern that includes activities categorized as intense focus can include restrictive models (e.g., that recommend blocking notifications) from the hierarchical library of models. For example, the customized transition model for a user with a first pattern that includes activities categorized as multitasking (e.g., several short activities) can include permissive models (e.g., that alert a user to non-work activity based on time or frequency) from the hierarchical library of models.

At 407, the processing device monitors the user activity. At 409, the processing device detects a trigger indicating a potential transition to the first pattern. In some implementations, another processing device can be used, for example, to monitor user activity 407 and detect the trigger at 409, as described above in reference to FIGS. 1-3. In response to detecting a trigger, the processing device proceeds to 411 to assessing context factors to detect if the user is engaging in non-work activities of the second pattern during a transition to the first pattern. If so, the processing device provides recommendations and restricts non-work usage of digital resources (e.g., websites, applications, etc.) to improve the user's to return to the first pattern (e.g., work activities). If non-work activities are not detected at 411, the processing device can return to 407 to continue monitoring user activity. It should be noted that the processing device continues to monitor user activities independent of block 407, such as to gather user information, feedback, performance, etc.

At 413, the processing device applies the customized transition model to provide direction to focused engagement in activities associated with the first pattern and restrict access to activities of the second pattern. The redirection can be a productivity plan that can include one or more directions to pre-break work; commonly used work related digital resources, suggestions based on schedule work activities, etc. For example, the productivity plan may include blocking or alerting the user to avoid using non-work related digital resources during the transition back to work. The customized transition model can be dynamically managing access to digital resources across multiple devices in order to improve the user's return to focused work.

At 417, the processing device can measure the user's rate of interaction with work related activities to determine if the user focus level satisfies a threshold. In response to the user focus on work activities satisfying the threshold, at 419, the processing device can restore access to non-work related activities.

In example implementations, the processing device receives feedback information associated with the transition. The processing device can further update the model based on received feedback information. The machine-learning process iteratively improves pattern detection, context factor analysis, and productivity plan recommendations. The feedback information can indicate the user's acceptance of the recommendation to perform a productivity plan, recorded feedback during performance of the first pattern (e.g., a user's productivity after returning to work activities), feedback from the user regarding their satisfaction with the recommendation, etc.

For example, feedback information can include the duration for transitioning back to the first pattern, tracking co-presence of another user, user location data, user survey, post-break activity, etc. If a user repeatedly rejects a recommended access policy at a particular time or for a particular digital resource, the system may adapt the model to reduce the weight of the access policy. If the user repeatedly rejects a recommended access policy in a particular context, the processing device can update the customized transition model to recommend a modified or different productivity plan (e.g., a productivity plan with lower threshold for focused work activity) based on the context. Through repetitive user interaction and feedback, the processing device can compare factors to identify correlations between the context and level of user engagement.

According to an example implementation, a user interface allows the user to associate and disassociate learned context factors to further customize the access policies.

After the user's transition back to the first pattern (e.g., work activity) is complete, at 419 the processing device can continue to track and analyze the user's activity to improve the customized transition model. In an example implementation, productivity factors can be identified, measured, and tracked to determine the effectiveness of the recommendations. For example, if the first pattern has measurable goals during a work period, the productivity across multiple first patterns (e.g., work periods) can refine the customized transition model to reach the goals more effectively. The user can also provide feedback to indicate the recommendation's impact on returning to the first pattern. For example, the user can adjust preferences; complete a satisfaction survey, etc.

In some example implementations, method 400 may be implemented with different, fewer, or more blocks. In an example implementation, blocks 401-405 may be implemented independently from blocks 407-413. For example, blocks 401-405 can be implemented as part of a training phase by a device to generate a model, and blocks 407-413 can be implemented as part of an activity phase by another device repeatedly to apply the model. In some example implementations, the process can periodically return to one of blocks 401-405 to incorporate feedback and update the model as described in greater detail in reference to FIG. 2. Method 400 may be implemented as computer executable instructions, which can be stored on a medium, loaded onto one or more processors of one or more computing devices, and executed as a computer-implemented method.

The activity engine determines a personalized productivity plan that is customized for the user based on the selected models modified by the user's storable patterns, adjusted for the user's recent activity levels, and tailored to satisfy personal preferences and context factors.

A reports interface (not shown) can provide the user with information regarding their patterns, behaviors, and performances during the productivity plan. For example, when the user returns to their desk to transition to focused work activities (e.g., the first pattern), the reports interface can summarize the user's time away from their desk (e.g., the second pattern). Reports information can include, for example, the time duration from return to desk until a focused work activity threshold is satisfied, difference between the user's recorded heart rate during the first pattern (e.g., pre-break activities), the second pattern (e.g., break activities) and when returning to the first pattern (e.g., post-break activities).

A feedback interface (not shown) can be used to receive input from the user to gather feedback, such experience sampling, user satisfaction, etc. The user feedback is fed back to the activity engine to improve the user's customized transition model for the next transition to the first pattern (e.g., returning to focused work).

Figure 5:
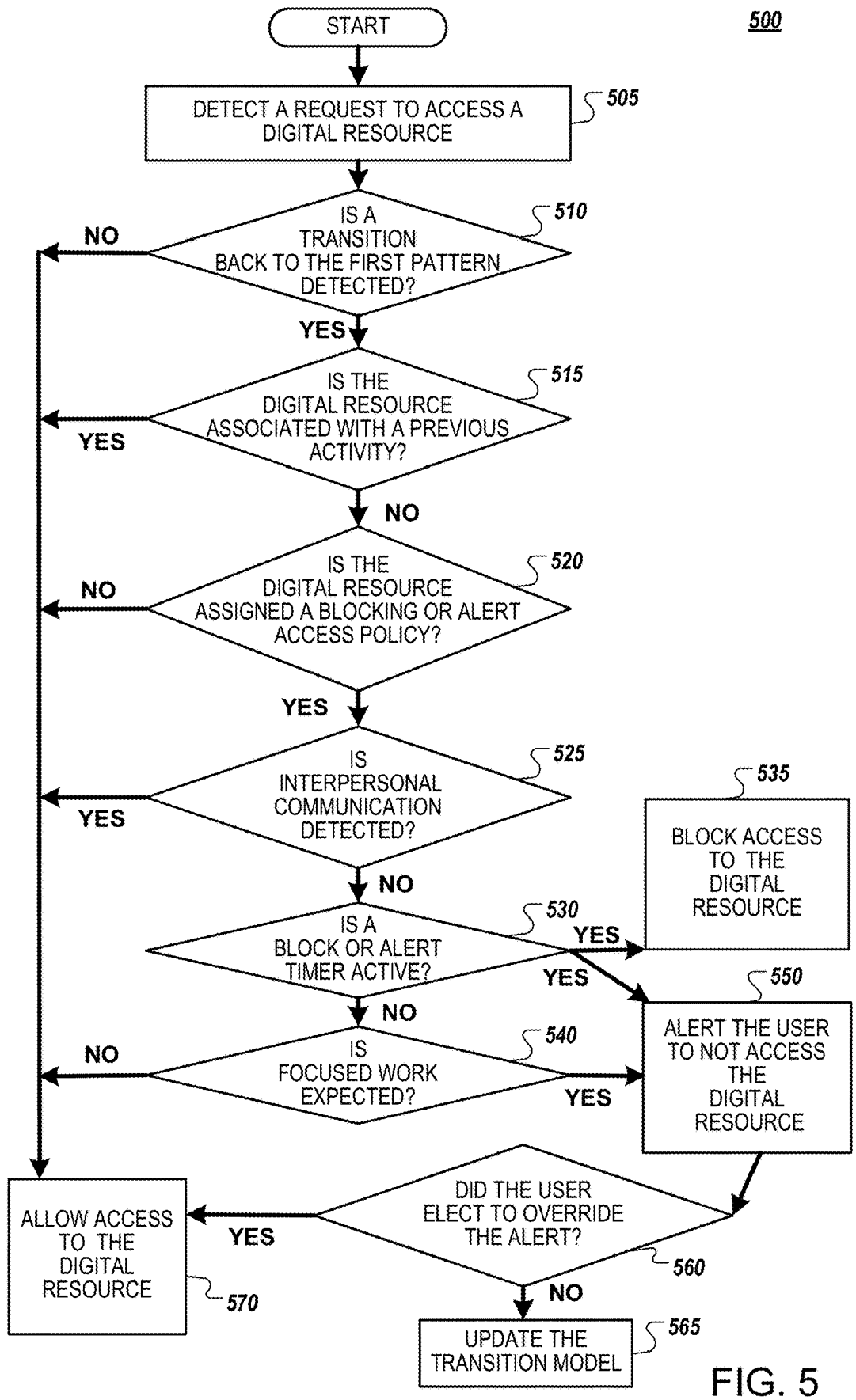
FIG. 5 illustrates a flow diagram for an example model in accordance with an example implementation.

FIG. 5 illustrates a flow diagram for an example model in accordance with an example implementation. In an example decision process for determining whether to block access to a digital resource, alert the user to redirect their focus to not access the digital resource, and/or allow access to the digital resource. In an example implementation, the processing device can detect a request to access the digital resource at 505. For example, the user may attempt to access a social networking website to make arrangements to meet with a social contact.

As discussed above, a conventional rule that blocks access to non-work related activities can result in a net loss of productivity when the user disengages from work completely in order to access the non-work related activity. For example, if the user is planning to meet with the social contact in the near future, the social networking website can be an efficient tool to make arrangements quickly. Thus, in some scenarios allowing access to the social networking website, rather than other means of communication (e.g., phone calls, voicemails, emails, etc.), allows the user to return to focused work quicker.

The illustrated process 500 can be executed by a processing device associated with an activity engine (e.g., activity engine 110 of FIG. 1, activity engine 210 of FIG. 2) that employs machine learning to effectively manage access to the digital resources during a transition from a second pattern to a first pattern (e.g., transition from break activities to focused work activities). The processing device can assist with improving performance during the transitions from the second pattern to the first pattern by customizing a model based on the user's behavior patterns.

Based on the users monitored behavior patterns, the transition model can implement a productivity plan to assist the user in suppressing distractions to balance non-work related activities with work-related activities. If the user plans to accomplish an amount of focused work prior to the meeting with the social contact, the transition module can aid in the user in accomplishing the focus work by reducing distractions so that the social commitment is met.

In a different transition model, access to a digital resource can be customized based on the source device of the request to access the digital resource. For example, the user's usage pattern of the social networking website on a mobile device may indicate brief engagement while transitioning to work activities and the user's usage pattern of the social networking website on a desktop device may indicate long periods of engagement. As discussed above, the activity engine analyzes the user's usage patterns to develop instructions and assign access policies for managing access to the digital resources.

At 510, the processing device can determine if a transition back to the first pattern (e.g., work) is detected. If a transition back to the first pattern is not detected, the processing device can disable the transition model and allow access to the digital resource at 570. In alternative embodiments, the activity engine may include models other than the transition model to address different user states.

When the user is transitioning from the second pattern to the first pattern (e.g., break activities to work activities), the processing device can assess one or more factors in view of the transition model to determine whether to block, alert, or allow access to the digital resource. For example, if the user is transitioning back to work (e.g., the first pattern), accessing the social networking website (e.g., an activity associated with the second pattern) may be determined to be a distraction that prevents the user from reaching a level of focused work. Accordingly, the transition model can combine multiple categorizations or context factors in dynamically managing access to the digital resource.

At 510, in response to the processing device determining that a transition from the second pattern to the first pattern is in process, the processing device, at 515, can check whether the digital resource is associated with a previous activity from the second pattern. In an example implementation, the processing device can determine if the digital resource was being used prior to a previous break from the first pattern. For example, if the user was in the middle of a conversation via the social networking website prior to taking the break (i.e., prior to a previous break from the first pattern), the transition model can determine to allow access to the non-work related digital resource (e.g., activity associated with the second pattern) so that the user can efficiently respond to a communication or complete the conversation and resume focused work activity (e.g., activity associated with the first pattern).

If the processing device, at 515, determines that that the social networking website was not active prior to the break, the transition model can indicate, based on the user's past behavior, that starting a social conversation via the social networking website is a distraction to avoid or delay access to the digital resource until a next scheduled break (e.g., the second pattern).

At 520, the transition model can indicate an access policy associated with the digital resource based on machine learning. In an example implementation, the transition model outputs a customized productivity plan with different access policies to be applied based on past monitored behaviors of the user. An access policy can be associated with the digital resource, a type of digital resource, one or more context factors, user feedback, etc. as discussed in greater detail above.

The transition model is configurable based on user preferences. For example, a category of non-work related digital resources can be assigned a less restrictive access policy (e.g., social applications), and a particular digital resource is blocked (e.g., an identified social dating application).

In this example, the transition model can at 525 allow access to digital resources associated with the first pattern if the type of digital resource is an interpersonal communication digital resource. In an example, the user's ability to carry on multiple conversations via digital resources may have little to no impact on maintaining a high rate of interaction with activities associated with the first pattern. In another example, some user's personal communication patterns (e.g., the second pattern) and work communication patterns (e.g., the first pattern) may overlap, such as users in a family business.

The transition model can manage access to the digital resource using various implementations. According to an example implementation, the transition module can activate an access policy based on the user's currently detected behavior, context factors, or other information (e.g., sensed data, pinpoint data, and environment data). For example, the user requesting access to the digital resource multiple times may trigger a more restrictive access policy. If pinpoint data shows the user has several upcoming meetings scheduled, the transition model can increase restrictions to non-work digital resources.

At 530, the processing device can determine if a block timer is active or an alert timer is active to restrict access to the digital resource. For example, the user may be blocked from accessing the social networking website via the desktop computer for a period of time while being alerted to avoid the distraction when accessing the social networking website via the mobile device. The access policy can enforce restricted access to block the user at 535 from using the digital resource for a period of time.

At 535, the processing device in view of a series of factors from various inputs can determine to block access to the activities associated with the second pattern (e.g., the non-work digital resource). The transition model can manage multiple levels of access for the same digital resource across multiple devices. The level of access can be based on multiple factors to allow the user's usage patterns in view of one context apply a first level of access while a change to a factor can apply a second level of access.

In response to a restriction timer not being active at 530, the processing device can determine if focused work is expected based on monitoring the user's rate of interaction with work activities at 540. The user's rate of interaction with work activities can be measured by the number of input commands associated with the work digital resources over a sample period of time. For example, the processing device can measure the user sending work-related email communications and calculate the rate of user input involved in the work-related email communications. When the user's rate of interaction is increasing, the processing device can determine that the user is engaged in focused work and enforce a more restrictive access policy for non-work related digital resources.

For example, to aid the user in focusing on the email communications while transitioning back from a break, the processing device can recommend the user focus on an email communication that was started before the break, suppress notifications from a mobile device, and/or alert the user to redirect away from a social networking website.

At 550, the processing device can alert the user to not access the non-work digital resource. An alert may be implemented to allow the user to override the alert and access the digital resource at 560. In response to the user overriding the alert the processing device can provide the override to the activity engine in order to update the transition model. At 565, an update to the transition model may change the access policy to be more restrictive or less restrictive based on the machine learning as discussed in reference to FIG. 2.

Figure 6:
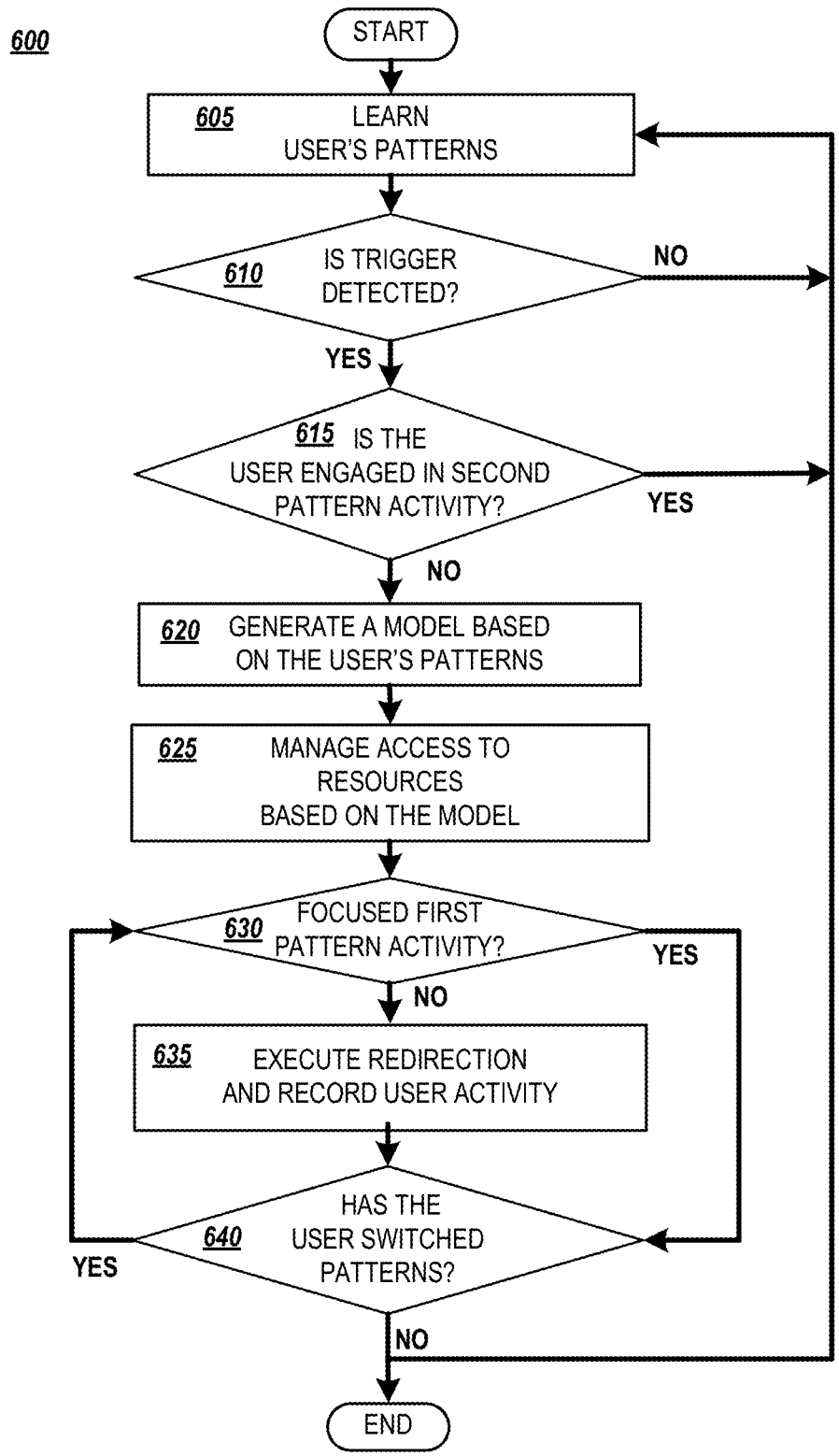
FIG. 6 illustrates a flow diagram for executing a customized model in accordance with an example implementation.

FIG. 6 illustrates a flow diagram for executing a customized model in accordance with an example implementation. In some example implementations, process 600 may be implemented with different, fewer, or more blocks. As discussed above in reference to FIG. 2, example implementations can include training phases and activity phases. In an example implementation, blocks 605 and 620 may be implemented in sequence with blocks 610, 615, 625-640. Process 600 may be implemented as computer executable instructions, which can be stored on a medium, loaded onto one or more processors of one or more computing devices (e.g., system 200 of FIG. 2), and executed as a computer-implemented method.

At 605, the system learns a user's patterns. In an example implementation, the system uses machine-learning to identify a first pattern and second pattern of the user based on received information associated with an activity. In example implementations, the system can actively monitor the information associated with the user activities in real time, based on a timed interval, or hierarchy of triggering factors. Real-time monitoring can be implemented by, for example, a camera system. Additionally, timed intervals may be static and preprogrammed to check a user's activity (e.g., to detect a change in the level of the activity) every so many number of seconds minutes or hours.

A dynamic time interval may gradually be adjusted to change the interval between checking the information associated with the user's activity. In an example implementation, the system checks for information based on a countdown interval in view of the patterns. For example, if a user routinely transitions from the first pattern to the second pattern (e.g., takes breaks) every 3 to 4 hours, then the system can decrease the interval between checking for information as the time since the previous transition to the first pattern (e.g., end of a break) increases towards the observed 3 to 4 hour interval.

In an example implementation, the system can use sensor data (e.g., pupil dilation) to estimate the user's focus (i.e., level of focused engagement in the activity). The system can track, for example, more frequently, when the level of focused engagement is below a threshold. A change in level of engagement can be used to adjust the countdown interval. In some implementations, the level of focused engagement or a rate of change in the level of focused engagement may indicate a transition from the first pattern to the second pattern (i.e., the user is taking a break from work activity). The system can weight contexts factors associated with a drop in the level of focused engagement based on the user's sensed behaviors. Upon detection of an unweighted context factor or new combination of context factors not previously observed, the system can adjust the countdown interval. For example, when the system detects the user has returned to their desk and using a new digital resources that has not been associated with the first pattern and the second pattern, the system can decrease the countdown interval between observations.

At 610, the system detects a trigger indicating a transition to the first pattern, as discussed above in reference to FIGS. 2-4. Additionally, a hierarchy of triggering factors may be used to detect a transition and/or adjust the interval for checking for information. In an example implementation, the system may sense a behavior indicating in the transition to the first pattern (e.g., a behavior indicating the user is returning to work).

In response to the trigger indicating a transition to the first pattern, at 615 the system inspects information such as pinpoint data in view of context factors to determine whether to user is engaged in activities associated with the second pattern (e.g., non-work related activities) interfering with a return to productive focused engagement in activities associated with the first pattern (e.g., work activities). For example, the system may detect a yawn monitor the user's eye gaze. The one or more observed behaviors may be detected as indicating the user is engaged with non-work activities while transitioning to the first pattern (e.g., returning to work).

At 620, the system generates a customized transition model based on the user's patterns. At 625, the system manages access to non-work related usage of digital resources based on the model. As discussed above in reference to FIGS. 2-4, example implementations for generating the customized transition model can include training data, context factors, a hierarchical library of models, etc. Further, the suggested access policies can incorporate context factors, feedback information, machine-learning, etc. for suggesting different redirections to the focused work (e.g., a productivity plan) based the first pattern (e.g., type of work activity, sensed data, environment, context factors, etc.).

At 630, the system determines whether the user's rate of interaction satisfies a threshold to indicate the user is engaged in focused activity associated with the first pattern. In response to the user failing to successfully transition to the first pattern, at 635 the model can further restrict access to activities associated with the second pattern (e.g., non-work) and provide positive redirection to the user to engage in first pattern related activity (e.g., work). The system can track and monitor the user activity during the transition to first pattern to improve pattern learning and customization of the recommendation. Accordingly, the user's productivity may be improved by suppressing notifications regarding non-work related activities until the user transitions to the first pattern is verified through the pattern recognition processes, as well as by iteratively improving suggestions to redirect away from non-work activities that distract the user from returning to the first pattern.

At 640, the system can monitor for the user switching back to the second pattern. If the user has not switched to the second pattern, the system can return to 630 to monitor the user during the first pattern to track the user remains engaged with the focused work activity for a period of time. The system can return to 605 to feed the user's behaviors back to learn and update the user's patterns.

Figure 7:
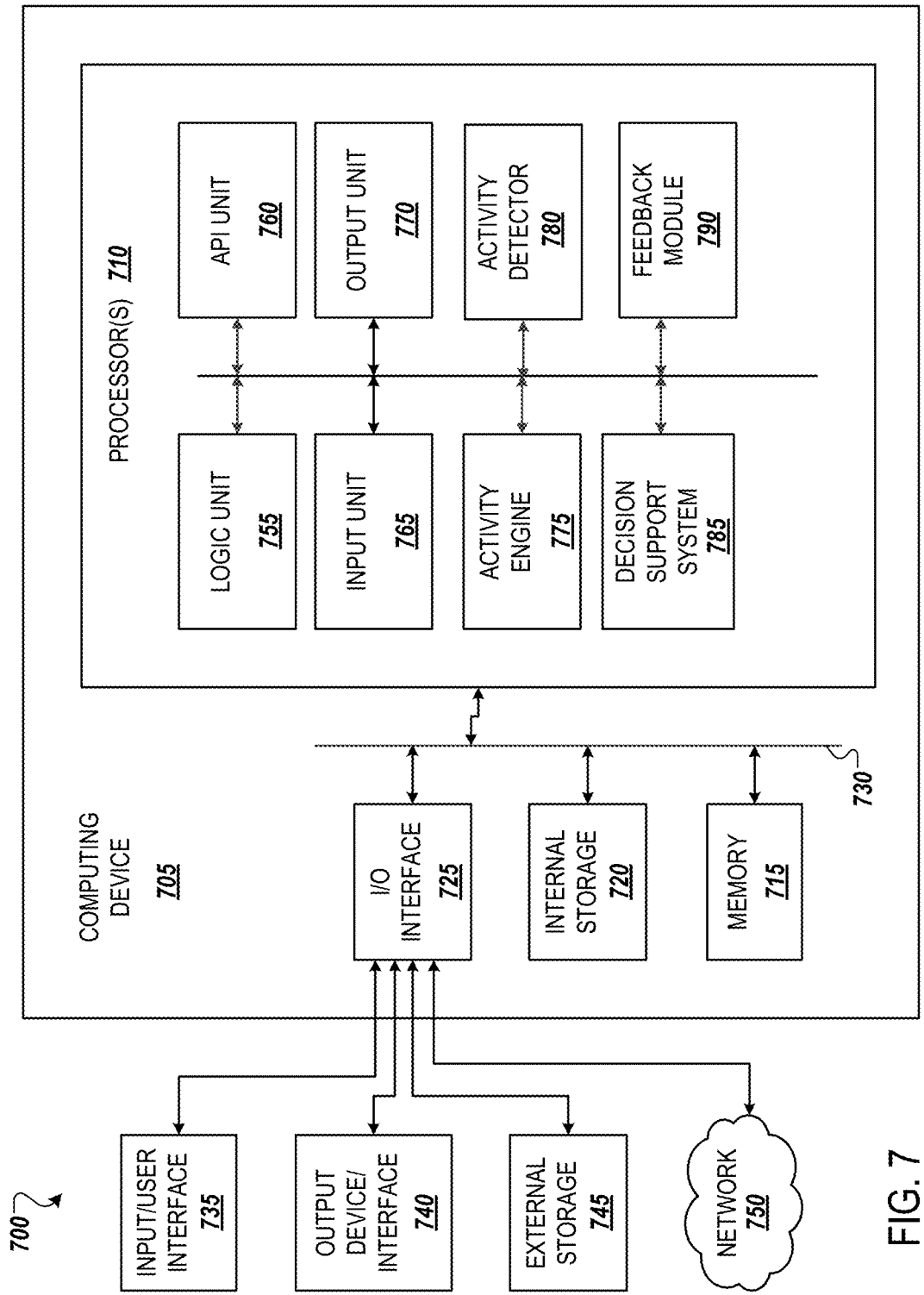
FIG. 7 illustrates an example server computing environment with an example computer device suitable for use in example implementations.

FIG. 7 shows an example computing environment with an example computing device associated with the external host for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual that can be used to provide input (e.g., buttons, touchscreen interface, keyboard, a pointing/cursor control, microphone, camera, braille, motion sensor, optical reader, and/or the like).

Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

The I/O interface 725 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, activity engine 775, activity detector 780, decision support system 785, and feedback module 790.

For example, input unit 765, activity engine 775, activity detector 780, decision support system 785, and feedback module 790 may implement one or more processes shown in FIGS. 2-5. The described units and elements can be varied in design, function, configuration, or implementation and are not limited to the descriptions provided.

In some example implementations, when information or an execution instruction is received by API unit 760, it may be communicated to one or more other units (e.g., logic unit 755, output unit 770, input unit 780, input unit 765, activity engine 775, activity detector 780, decision support system 785, and feedback module 790).

Input unit 765 may, via API unit 760, interact with the activity engine 775 and activity detector 780 to provide the input information associated with an activity. Using API unit 760, decision support system 785 can analyze the information to identify activity patterns and generate a customized transition model for managing the user's access to non-work related activities and digital resources according to a productivity plan. Feedback module 790 may refine the customized transition model with updated information, for example.

In some instances, logic unit 755 may be configured to control the information flow among the units and direct the services provided by API unit 760, input unit 765, output unit 770, input unit 765, activity engine 775, activity detector 780, decision support system 785, and feedback module 790 in some example implementations described above. For example, the flow of one or more processes or implementations may be controlled by logic unit 755 alone or in conjunction with API unit 760.

Figure 8:
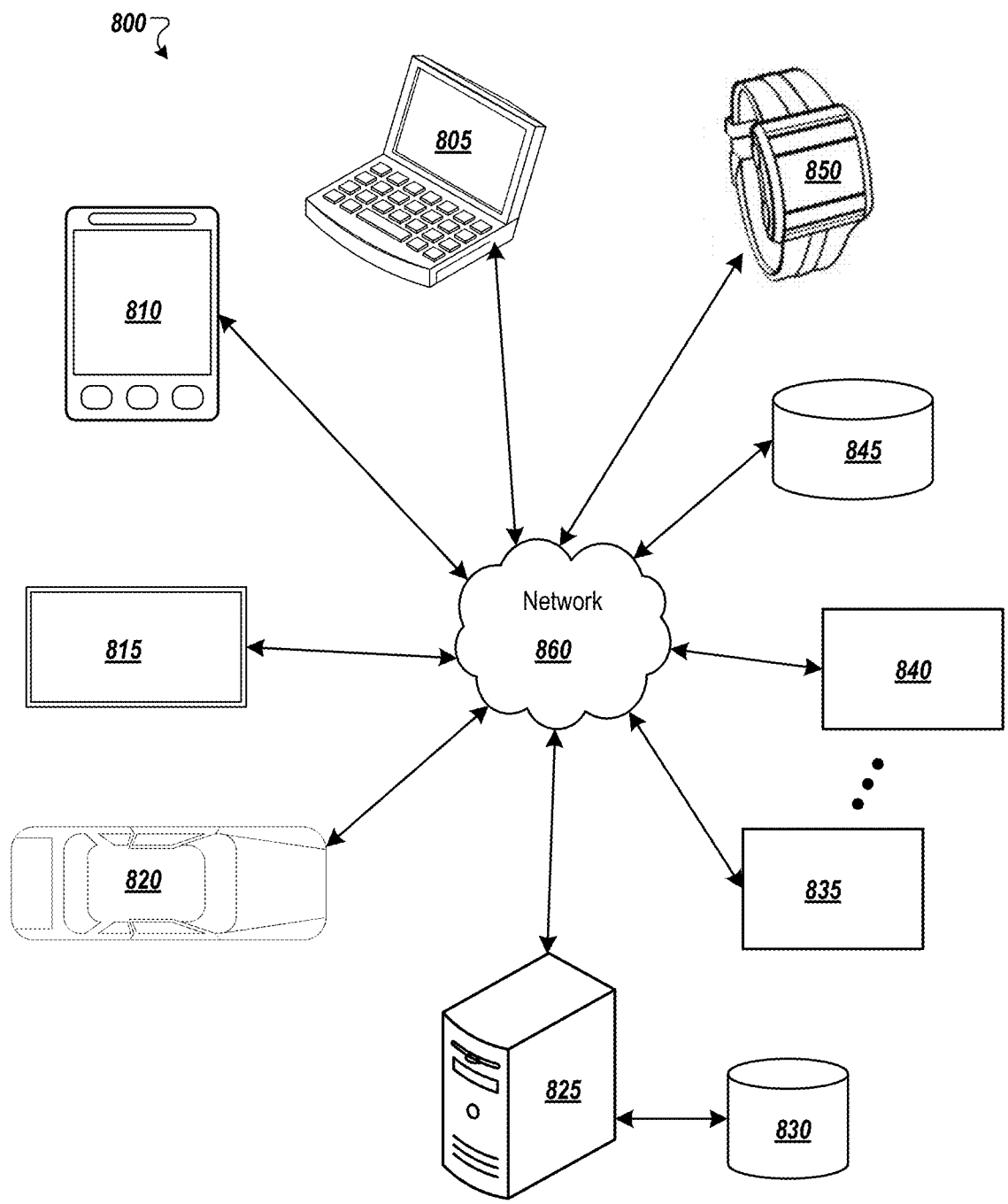
FIG. 8 illustrates an example networking environment with example computer devices suitable for use in example implementations.

FIG. 8 shows an example environment suitable for some example implementations. Environment 800 includes devices 805-850, and each is communicatively connected to at least one other device via, for example, network 860 (e.g., by wired and/or wireless connections). Some devices may be communicatively connected to one or more storage devices 830 and 845.

An example of one or more devices 805-850 may be computing devices 905 described in regards to FIG. 9, respectively. Devices 805-850 may include, but are not limited to, a computer 805 (e.g., a laptop computing device) having a display and as associated webcam as explained above, a mobile device 810 (e.g., smartphone or tablet), a television 815, a device associated with a vehicle 820, a server computer 825, computing devices 835-840, storage devices 830 and 845. As explained above, the meeting environment of the user may vary, and is not limited to an office environment.

In some implementations, devices 805-820, 850 may be considered user devices associated with the users of the enterprise. Devices 825-850 may be devices associated with client service (e.g., used by the users or administrators to provide services as described above and with respect to FIGS. 1-2, and/or store data, such as sensed data, pinpoint data, environment data, webpages, text, text portions, images, image portions, audios, audio segments, videos, video segments, and/or information thereabout).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "receiving," "analyzing," "determining," "generating," "identifying," "indicating," "detecting," "managing," "applying," "obtaining," "monitoring," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with JavaScript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for modifying productivity, the method comprising:
 receiving, from one or more sensors communicatively coupled to a processor, in real time, information associated with an activity, wherein the information includes heart rate, pupil dilation, eye gaze direction, and client-service monitored data;
 using the processor to analyze the information to identify a first pattern and a second pattern based on sensed changes in the heart rate, pupil dilation, eye gaze direction, and client-service monitored data;
 using the processor to generate a customized transition model for returning to the first pattern from the second pattern based on experience sampling including one or more of training data, rules, environmental controls, social graphs, and feedback, wherein the customized transition model includes a productivity plan for suggesting digital resources access based on activities of the first pattern during a previous session;

in response to a detected trigger indicating a transition to the first pattern, using the processor to assess context factors and dynamically managing access to digital resources during the transition to the first pattern by applying the customized transition model, wherein access to the digital resources is restricted during the transition to the first pattern, wherein, when the processor determines that particular digital resources were accessed during the first pattern prior to entering the second pattern, the customized transition model allows access to the particular digital resources during the transition to the first pattern, and when the processor determines that particular digital resources were not accessed during the first pattern prior to entering the second pattern, the customized transition model restricts or delays access to the particular digital resources; and in response to determining that a level of focused engagement in activities associated with the first pattern satisfies a threshold, using the customized transition model to automatically restore access to the digital resources that were restricted during the transition to the first pattern.

2. The method of claim 1, wherein the level of focused engagement in activities associated with the first pattern is based on a rate of interaction satisfying a threshold.

3. The method of claim 2, wherein the rate of interaction includes a rate of user events in an application category during a period, and the threshold is satisfied in response to an average rate of the user events during the period as compared with past periods.

4. The method of claim 1, wherein the productivity plan comprises determining whether to display an alert to the user or block access to an activity associated with the second pattern.

5. The method of claim 1, wherein the generating the customized transition model further comprises calculating a focus ratings associated with the user based on the user feedback associated with the digital resources.

6. The method of claim 1, wherein the detected trigger indicating a transition to the first pattern is based on tracking one or more of a user's body movements, location, and eye gaze.

7. The method of claim 1, wherein the dynamically managing access to digital resources includes managing digital resources differently on co-located multiple devices that are associated with the user.

8. The method of claim 1, wherein the information includes one or more of sensed data, pinpoint data, and environment data.

9. The method of claim 1, wherein the information comprises one or more of location data, physiological data, computer usage, phone usage, and sensor data.

10. The method of claim 1, further comprising:
receiving feedback information associated with the first pattern, wherein the feedback information comprises one or more of a duration for returning to the first pattern, tracking co-presence of another user, user location data, user survey, and post-break activity; and
updating the model based on the received feedback information.

11. The method of claim 1, wherein the client-service monitored data includes one or more of accessed applications, keystrokes, and mouse activities.

12. A system for improving productivity comprising:
a memory;
one or more sensors communicatively coupled to a processor;
the processor operatively coupled to the memory, the processor configured to:
receive information in real time from the one or more sensors, the information being associated with an activity, wherein the information includes heart rate, pupil dilation, eye gaze direction, and client-service monitored data;
analyze the information to identify a first pattern and a second pattern based on changes in the heart rate, pupil dilation, eye gaze, and client-service monitored data;
generate a customized transition model for returning to the first pattern from the second pattern based on experience sampling including one or more of training data, rules, environmental controls, social graphs, and feedback, wherein the customized transition model includes a productivity plan for suggesting digital resources access based on activities of the first pattern during a previous session;
in response to a detected trigger indicating a transition to the first pattern, assess context factors and dynamically manage access to digital resources during the transition to the first pattern by applying the customized transition model, wherein access to the digital resources is restricted during the transition to the first pattern,
wherein, when the processor determines that particular digital resources were accessed during the first pattern prior to entering the second pattern, the customized transition model allows access to the particular digital resources during the transition to the first pattern, and when the processor determines that particular digital resources were not accessed during the first pattern prior to entering the second pattern, the customized transition model restricts or delays access to the particular digital resources; and
in response to a determination that a level of focused engagement in activities associated with the first pattern satisfies a threshold, use the customized transition model to automatically restore the access to the digital resources that were restricted during the transition to the first pattern.

13. The system of claim 12, wherein the level of focused engagement in activities associated with the first pattern is based on a rate of interaction satisfying a threshold, wherein the rate of interaction includes a rate of user events in an application category during a period, wherein the threshold is satisfied in response to the average rate of user events during the period compared to past periods.

14. The system of claim 12, wherein the processor further configured to:
receive feedback information associated with the first pattern, wherein feedback information comprises one or more of duration for returning to the first pattern, tracking co-presence of another user, user location data, user survey, and post-break activity; and
update the model based on the feedback information.

15. The system of claim 12, wherein the client-service monitored data includes one or more of accessed applications, keystrokes, and mouse activities.

16. A non-transitory computer readable medium, comprising instructions that when executed by a processor, the instructions to:
receive information, from one or more sensors communicatively coupled to the processor, in real-time, the information being associated with an activity, wherein the information includes heart rate, pupil dilation, eye gaze direction, and client-service monitored data;

analyze the information to identify a first pattern and a second pattern based on sensed changes in the heart rate, pupil dilation, eye gaze direction, and client-service monitored data;

generate a customized transition model for returning to the first pattern from the second pattern based on experience sampling including one or more of training data, rules, environmental controls, social graphs, and feedback, wherein the customized transition model includes a productivity plan for suggesting digital resources access based on activities of the first pattern during a previous session;

in response to a detected trigger indicating a transition to the first pattern, using the processor to assess context factors and dynamically managing access to digital resources during the transition to the first pattern by applying the customized transition model, wherein access to the digital resources is restricted during the transition to the first pattern;

wherein, when the processor determines that particular digital resources were accessed during the first pattern prior to entering the second pattern, the customized transition model allows access to the particular digital resources during the transition to the first pattern, and when the processor determines that particular digital resources were not accessed during the first pattern prior to entering the second pattern, the customized transition model restricts or delays access to the particular digital resources; and in response to a determination that a level of focused engagement in activities associated with the first pattern satisfies a threshold, use the customized transition model to automatically restore the access to the digital resources that were restricted during the transition to the first pattern.

17. The non-transitory computer readable medium of claim 16, wherein to generate the customized transition model further comprises calculating a focus ratings associated with the user based on the user feedback associated with the digital resources.

18. The non-transitory computer readable medium of claim 16, wherein the customized transition model is generated using machine-learning associated with one or more of training data, user preferences, environmental controls, and social graphs.

19. The non-transitory computer readable medium of claim 16, wherein the dynamically managing access to digital resources includes managing digital resources differently co-located on multiple devices that are associated with the user.

20. The non-transitory computer readable medium of claim 16, wherein the instructions are further to:

receive feedback information associated with the first pattern, wherein feedback information comprises one or more of duration for returning to the first pattern, tracking co-presence of another user, user location data, user survey, and post-break activity; and update the model based on the feedback information.

21. The non-transitory computer readable medium of claim 16, wherein the client-service monitored data includes one or more of accessed applications, keystrokes, and mouse activities.

* * * * *